UNITED STATES PATENT OFFICE.

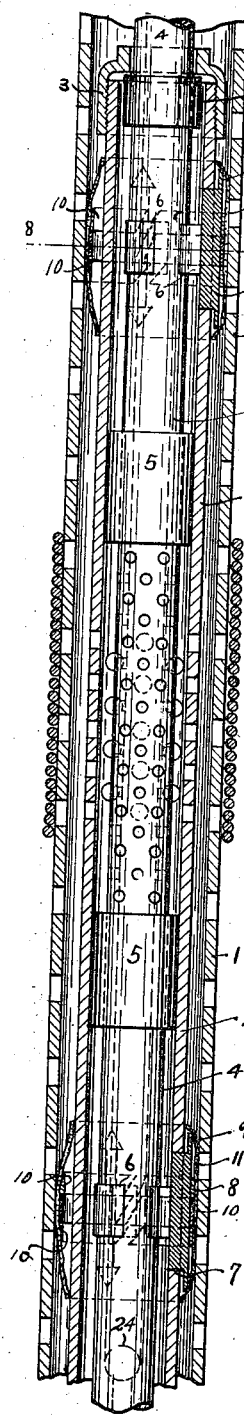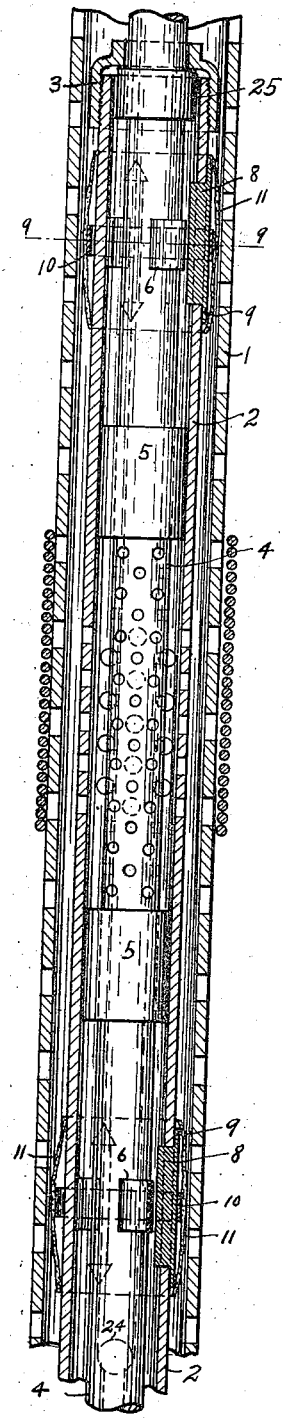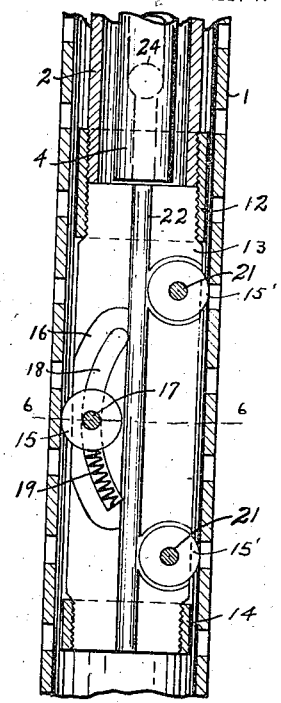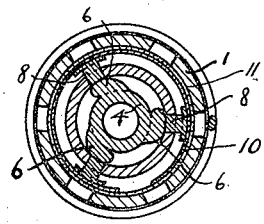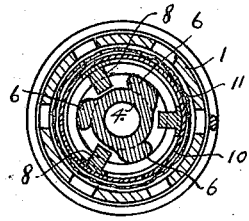

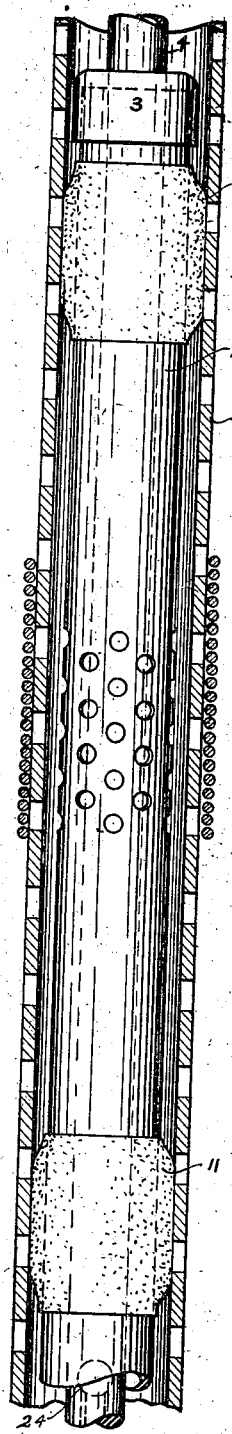

AARON L. WILKIRSON, OF HOUSTON, TEXAS.

WELL-SCREEN WASHER AND PERFORATOR.

1,298,131.   Specification of Letters Patent.   Patented Mar. 25, 1919.

Application filed July 20, 1918. Serial No. 245,807.

*To all whom it may concern:*

Be it known that I, AARON L. WILKIRSON, a citizen of the United States, residing at Houston, in the county of Harris and State of Texas, have invented certain new and useful Improvements in Well-Screen Washers and Perforators, of which the following is a specification.

This invention relates to new and useful improvements in a well screen washer and perforator.

The object of the invention is to provide a device of the character described, whereby the screen set in an oil well may be washed and cleansed.

Another object of the invention is to provide a device of the character described, whereby the pipe to which the screen is attached may be perforated and washed so that the same will become loosened in the bore and may be withdrawn.

In the production of oil from wells, a well screen is usually set in the oil bearing strata. This screen is connected to the lower end of the pipe through which oil is conducted to the surface of the ground and usually consists of a perforated pipe wound with screening wire, which is spiraled thereon and whose turns are spaced apart to permit the inflow of the fluid into the screen from which the fluid passes up through the pipe to which the screen is connected to the surface of the ground. The screen often becomes clogged with mud or other sediment, so as to entirely or partly close up the slits in the screen and prevent or retard the inflow of the fluid.

It is the object of this invention to provide a washer whereby the screen may be unclogged and cleansed, in case it has been stopped up.

It often happens that a section of the pipe to which the screen is attached is set opposite oil bearing strata and in such case, the device herein described may be used to perforate and wash out said section, and in effect, form it into a screen which will admit the oil from said strata.

With the above and other objects in view, the invention has particular relation to certain novel features of construction, operation and arrangements of parts, an example of which is given in this specification and illustrated in the accompanying drawings, wherein:

Figure 1, is a vertical sectional view of the upper part of the washer.

Fig. 2, shows a vertical sectional view of the lower part thereof.

Fig. 3, shows a fragmentary vertical, sectional view of the screen, and outer pipe, showing the stem or inner pipe in elevation.

Fig. 4, shows a vertical sectional view of the screen showing a side elevation of the device therein.

Fig. 5, shows a side elevation of the lower end of the device.

Fig. 6, shows a transverse sectional view, taken on the line 6—6 of Figs. 2 and 5, Fig. 7, shows a side view of the packer setting mechanism.

Fig. 8, shows a transverse sectional view of the device, taken on the line 8—8 of Fig. 1.

Fig. 9, shows a transverse sectional view, taken on the line 9—9 of Fig. 3, and

Figs. 10, and 11, show elevation views of the gripping rollers, of the packer setting mechanism.

Referring now more particularly to the drawings wherein like numerals of reference designate similar parts in each of the figures, the numeral 1, refers to a well screen, formed of perforated pipe wrapped with screen wire. This screen, in use, is set in the oil bearing strata, and when it becomes clogged with sediment, the oil is excluded, and it becomes necessary to clean out the screen to permit the free inflow of the oil from the surrounding reservoir. The numeral 2, refers to an outer pipe section, the upper end of which carries a reducer 3, forming a bearing through which the stem or inner pipe 4 works. This stem has the collars 5, 5, fixed thereon, and spaced apart, to confine the water between them and force it to pass through the perforations of the outer pipe section, and fixed on the stem in the outer pipe 2, and spaced above and below the respective collars 5, 5, are the respective series of cams 6, 6, 6, which fit within the outer pipe 2, and are in transverse alinement with the expanders, hereinafter described. The outer pipe is provided with two series of oblong slots 7, 7, 7, one series being located near the upper end of said pipe and the other series being located near the lower end thereof, the slots of each series being spaced a uniform distance apart, around said pipe and through these slots, work the expanders 8, 8, 8. These expanders project through said slots and have the extensions 9, which engage against the outer side of the pipe to prevent them from passing inwardly through said slots. Surrounding each series of expanders are the expansible rings 10, which, in turn, are surrounded by packers, which are formed of rubber, or some other suitable expansible material. The pipe 2, has a perforated section, and opposite this section, the stem 4 is also perforated, between the collars 5, 5. Attached to the lower end of the pipe 2, by means of the collar 12, is the packer setting mechanism 13, which is formed of two semi-cylindrical sections 13′, 13′, which are secured together at their upper ends by means of the collar 12, and by the collar 14, at their lower ends. This mechanism has the gripping rollers 15, and 15′, 15′, the former of which works in an outwardly curved arcuate bearing 16. The roller 15 is mounted on a bearing pin 17, whose ends project into arcuate slots 18, 18. Cut into the sections 13′, 13′, and seated in the lower ends of the slots 18, and resting against the corresponding ends of the pin 17, are the push springs 19, 19. The rollers 15′ 15′ work in recesses 20, opposite, and arranged in staggered relation to, the bearing 16, and are rotatable on fixed pins 21, 21. This mechanism has a water passageway 22, therethrough, and the lower end of the stem 4 is formed into a seat 23, through which water may be forced down through said stem and through the water passageway 22, into the well to wash out the interior of the strainer, and after this has been done, the ball 24 may then be dropped through the stem into said seat to block the same and prevent the further passage of water therethrough, for the purpose hereinafter explained.

When it is desired to wash out and cleanse the screen at any particular point, the device is let down into the well, a sufficient number of joints of the stem 4, being screwed together to give it the required length. While the device is being let down into the well, the outer pipe 2 will be sustained in position relative to the stem 4, by the collar 25, which is screwed on said stem within the reducer 3, and the in 17, of the gripping roller 15, will rest in the upper end of the slot 18, said roller receding into the upper end of the bearing 16, out of contact with the screen 1. When in this position, water may be pumped down through the stem, and it will pass on down through the seat 23, and the passageway 22, to the bottom of the strainer, and pass up freely within the strainer on the outer side of the pipe 5, to wash out the interior of the strainer. The ball 24 is then dropped down through the stem to close the seat 23. An upward pull is then exerted on the stem 4, and the friction of the rollers 15, 15′, 15′, operates to retard and temporarily stop the upward movement of the packer setting mechanism 13, and anchor the same against turning. The stem 4 is then turned one third of the way around, and the cams 6, 6, 6, which normally rest between the expanders 8, 8, 8, contact against said expanders, expanding them and forcing the packers 11, against the screen. Fluid is then forced downwardly under pressure through the stem, and it will pass out through the perforations in said stem and in the outer pipe 2, into the space between the outer pipe and the screen, and will be forced by the packers 11, to pass on out through the screen, thus unclogging the slits between the screen wire. The length of the section of the screen cleansed will depend upon the distance the packers 11 are located apart. If it is desired to move the washer upwardly, in the screen, to wash out and clean another section thereof, the stem 4 is given another third of a turn, causing the cams 6 to release the expanders 8, and a further upward pull on the stem will operate to release the friction rollers, 15, 15′, 15′ causing a relative downward movement of the roller 15, into the lower end of the bearing 16, and when a point is reached where it is again desired to wash the screen, the stem may be forced downwardly, and the friction roller 15, being held in frictional engagement with the inner wall of the screen by means of the springs 19, will operate to retard the downward movement of, and anchor the packer setting mechanism, 13, relative to the screen 1, and another partial turn of the stem will operate through the cams 6 to again expand the expanders 8, and set the packing 11 in the screen, and another section of the screen may be then washed out as above described.

If it is desired to lower the washer in order to cleanse a lower section of the screen, a downward pressure may be exerted on the stem 4, whose lower end will contact against the upper end of the packer setting mechanism 13, and force it downwardly, causing the friction roller 15 to recede into the upper end of the bearing 16, and permitting the entire device to move downwardly into the screen, until the desired point is reached. This roller 15, however, is held by gravity in frictional contact with in the inner wall of the screen, and an upward pull on the stem will now cause it, in coöperation with the rollers 15′, 15′, to engage with the screen and temporarily retard the upward movement of the packer, and anchor it against turning in the screen, and a partial rotation of the stem 4, as above explained, will cause the cams 6 to engage with the expanders 8, as hereinbefore explained, and set the packing 11, and another section of the screen may then be washed out and cleansed, as explained.

In Fig. 11, I have shown the frictional rollers 15 having sharp cutting edges. This form of roller is used when it is desired to provide additional perforations in the pipe against which the rollers operate, the sharp edges of the rollers cutting through the pipe and perforating the same as the mechanism 13 is moved upwardly or downwardly. This form of roller is used when it is desired to perforate the pipe in the bore, and force water through the perforations so as to wash the pipe loose from the walls of the bore to permit its withdrawal; also when a solid pipe has been set opposite oil bearing strata to perforate the same, and admit the oil from the surrounding reservoir into the interior of the pipe. In this latter case, the pipe is washed out so as to unclog the perforations, to freely admit the oil into the pipe.

What I claim is:

1. A washer for wells, including an outer pipe, having perforated sections, expansible members surrounding said pipe and spaced apart, and means operating within said pipe for engaging with and operating said members.

2. A washer for wells, including a pipe, having a perforated section, and adapted to be let down within the well screen, expansible members carried by said section and spaced apart, and means operating within said pipe and simultaneously expanding said members against the inner wall of the well screen.

3. A washer for well screens, including a tubular member, having a perforated section, and adapted to be let down into the well screen, a tubular stem within said member, having a perforated section, said stem being movable in said member, expansible packers carried by said member and spaced apart, and means carried by said stem, for simultaneously engaging against the packers to force them against the screen wall.

4. A washer for well screens, including a tubular member, having a perforated section, a stem within said member, having a perforated section, and from which the member is suspended, said stem being rotatable, relative to the member, expansible packers carried by the said member and spaced apart, means carried by the stem and located so as to engage simultaneously with the packers, and expand the same against the screen, as the stem is rotated in said member, and a packer setting mechanism carried by said member and arranged to engage with the screen and anchor said member, when the stem is rotated.

5. A washer for well screens, including a tubular member, having a perforated section, expansible packers carried by said member and spaced apart, a tubular stem within said member having a perforated section, said stem being rotatable in said member, means carried by the stem to simultaneously engage with said packers as the stem is rotated to expand the packers against the well screen, and means carried by said member and engaging with the screen to anchor said member against rotation when the stem is rotated.

6. A washer for well screens, including a tubular member, provided with a fluid outlet and adapted to be let down into a well screen, expansible packers carried by said member and arranged on opposite sides of the outlet, a tubular stem within said member and provided with a fluid outlet, actuating means carried by the stem and spaced apart, and adapted to engage with said packers simultaneously to expand them against the screen.

7. A washer for well screens, including a tubular member, provided with a fluid outlet, and adapted to be let down into a well screen, expansible packers carried by said member, and arranged on opposite sides of the outlet, a tubular stem within said member, and provided with a fluid outlet, collars fixed to the stem on opposite sides of said outlet and fitting closely in said member.

8. A device of the character described, including the combination with a pipe perforator, of means for forcing water through the perforations formed by the perforator.

9. In a device of the character described, the combination with cutting disks, of a support therefor, means for supporting said support within a pipe to bring said disks in frictional contact with the pipe whereby they are forced through the pipe, thereby perforating the same, and means for forcing water from the interior through said perforations to the exterior of said pipe.

10. In a device of the character described, the combination with a tubular member, having a perforated section, of expansible packers carried by said member and spaced apart, a tubular stem within said member having a perforated section, said stem being rotatable in said member, means carried by the stem to simultaneously engage with said packers as the stem is rotated to operate the packers against the surrounding pipe, and means carried by said member and engaging with and perforating the pipe, as the device is moved up or down, said means also operating to anchor said member against rotation when the stem is rotated.

In testimony whereof I have signed my name to this specification in the presence of two subscribing witnesses.

AARON L. WILKIRSON.

Witnesses:
　JAS. W. OLIVER,
　IRENE BRUNS.